United States Patent [19]

Sare

[11] Patent Number: 4,807,964

[45] Date of Patent: Feb. 28, 1989

[54] PLASTIC OPTICAL FIBER

[75] Inventor: Edward J. Sare, Clinton, Ohio

[73] Assignee: PPG Industries, Inc., Pittsburgh, Pa.

[21] Appl. No.: 60,795

[22] Filed: Jun. 12, 1987

[51] Int. Cl.$^4$ .................................................. G02B 6/00
[52] U.S. Cl. ............................... 350/96.34; 350/96.29
[58] Field of Search ........................... 350/96.34, 96.29

[56] References Cited

U.S. PATENT DOCUMENTS

| | | | |
|---|---|---|---|
| 3,908,121 | 9/1975 | Riseberg et al. | 350/96.13 |
| 3,930,103 | 12/1975 | Chimura et al. | 428/361 |
| 3,993,834 | 11/1976 | Chimura et al. | 428/373 |
| 4,161,500 | 7/1979 | Schleinitz et al. | 264/1 |
| 4,264,750 | 4/1981 | Anand et al. | 525/356 |
| 4,381,269 | 4/1983 | Kaino et al. | 264/1.5 |
| 4,404,256 | 9/1983 | Anand et al. | 428/409 |
| 4,491,653 | 1/1985 | McGinniss | 525/356 |
| 4,542,957 | 9/1985 | Ishiwari et al. | 350/96.34 |
| 4,568,146 | 2/1986 | Ueba et al. | 350/96.34 |
| 4,575,188 | 3/1986 | Ueba | 350/96.34 |

FOREIGN PATENT DOCUMENTS 149306 7/1985 European Pat. Off. .

*Primary Examiner*—William L. Sikes
*Assistant Examiner*—Robert E. Wise
*Attorney, Agent, or Firm*—Irwin M. Stein

[57] ABSTRACT

Light transmitting plastic fibers having a vinylidene chloride polymer core, and fibers having a core-cladding structure in which the core is the aforedescribed vinylidene chloride polymer and the cladding is a plastic polymeric material having a lower refractive index are described. Graded index fibers of a surface fluorinated vinylidene chloride polymer are also described.

13 Claims, No Drawings

PLASTIC OPTICAL FIBER

DESCRIPTION OF THE INVENTION

Optical fibers are well known in the art for transmission of light along a length of filament by multiple internal reflections of the light. Great care is taken to minimize loss of light due to its absorption and scattering along the length of the fiber so that light applied to one end thereof is efficiently transmitted to the opposite end. The light transmitting portion or core of the optical fiber may be surrounded by cladding having an index of refraction lower than that of the core so as to achieve a greater degree of total internal reflection along the length of the fiber. The cladding material is normally chosen to be transparent since an opaque cladding tends to absorb or scatter light.

Optical fibers have been produced from glass and such fibers are widely utilized in industry, in medical treatment and in the transmission of information. However, light transmitting fibers made of glass are expensive, heavy in weight and relatively low in flexibility. Optical fibers containing a glass core may be protected by the use of a shielding Plastic layer, e.g., a thermoplastic or thermosetting polymer, but such shielding adds undesired bulk, weight and expense. Moreover, this fiber does not always enable the fiber to be used in situations where bending to a small radius of curvature is helpful or required. Consequently, it has been proposed that light transmitting fibers be made from synthetic high polymers.

Light transmitting fibers fabricated from synthetic high polymers are light in weight and have greater flexibility than glass fibers. While these plastic fibers are less subject to fracturing due to bending, they more strongly attenuate the light passing through them. To improve light transmission through the plastic fiber, a sheath or cladding of a synthetic polymer having a lower index of refraction has been placed around the plastic fiber core. The core-cladded fiber structure thus obtained transmits a greater amount of incident light due to improved reflection of light at the interface of the cladding and core. The greater the difference in refractive index between the core polymer and the cladding polymer, the lower is the loss in transmitted light through the fiber.

Synthetic high polymers that have been suggested for use as core materials for optical fibers are polystyrene and poly(methyl methacrylate). Poly(methyl methacrylate) is reported as more preferable than polystyrene as the core material for light transmitting fibers because it is superior for transmission of light of wide wave length, in mechanical strength and in dimensional heat stability. Poly(methyl methacrylate) is transparent, but has a relatively low index of refraction, i.e., 1.48 to 1.50. Therefore, when this polymer is used as a core component, there are a somewhat limited number of resins of desirable lower refractive index available that optimally may be used as the cladding component. The core and cladding are concentrically assembled to form a composite optical fiber so that incident light introduced from one end of the optical fiber is subjected to total reflection and is transmitted in a lengthwise direction through the optical fiber.

Transparent synthetic polymers having a refractive index of less than 1.48-1.50 that have been suggested for use as the cladding or sheath material for poly(methyl methacrylate) include: poly(vinylidene fluoride), vinylidene fluoride-tetrafluoroethylene copolymers, vinylidene fluoridetetrafluoroethylene-hexafluoropropylene terpolymers. Fluorine-containing methyl acrylate polymers, fluorine-containing methyl acrylate methylmethacrylate copolymers, silicone resins and ethylene-vinyl acetate copolymers.

When used continuously at temperatures as high as 80° C., plastic optical fibers may be susceptible to deterioration by oxidation. Oxidation of the plastic fiber lowers the light transmission property due to formation of a chemical bond that absorbs light. Therefore, it has been proposed to wrap or coat the outer layer of a plastic optical fiber, e.g., the sheath or cladding layer, with a resin which prevents significant transmission of oxygen so as to prevent oxidation of the fibers. It has also been proposed for cladded halide optical fibers used for infrared transmission to interpose a further inner polymer film of low oxygen transmission between the interface of the core and cladding in addition to wrapping the optical fiber with a low oxygen transmission polymer. Resins having low oxygen transmission include polyamides, polyethylene ethylene-vinyl alcohol copolymer, cellophane, polyvinylidene chloride, polyvinyl fluoride and polyvinylidene fluoride.

In the preparation of plastic optical fibers, it is important to obtain as large a difference in refractive index between the core and cladding components as is reasonably possible, keeping in mind other factors such as adhesiveness between the core and cladding components at their interface, mechanical strength of materials, heat stability and processability.

In accordance with the present invention, there are described light transmitting plastic fibers having a vinylidene chloride polymer core. Vinylidene chloride polymer has a refractive index of about 1.6 and hence provides a larger numerical difference in refractive index between the core and cladding components than is offered by a poly(methyl methacrylate) core which, as reported, has a refractive index of about 1.48 to 1.50. Further, use of vinylidene chloride polymer as the core component permits use of a larger number of transparent polymers as the cladding component than when poly(methyl methacrylate) is used as the core component.

In a further embodiment of the present invention, a gradient index vinylidene chloride polymer fiber is contemplated. Such a material comprises a vinylidene chloride fiber having its exterior surface fluorinated. The degree of fluorination decreases along the radial axis of the fiber, thereby resulting in a fiber in which the chemical composition varies from the surface to the maximum depth of fluorination.

DETAILED DESCRIPTION OF THE INVENTION

Homopolymers and copolymers of vinylidene chloride are well known and methods of their preparation have been described in the art. As used in the present description and claims, the term vinylidene chloride polymer or like term is intended to mean and include both homopolymers of vinylidene chloride and copolymers of vinylidene chloride. Copolymers of vinylidene chloride are preferred because they are more easily fabricated by, for example, injection molding. Vinylidene chloride copolymers that may be used to prepare optical fibers should advantageously contain at least 60 mole percent of vinylidene chloride, e.g., from about 60 to about 95 mole percent vinylidene chloride. More advantageously, the copolymer should contain from about 75 to about 95, e.g., 75 to 80, mole percent vinylidene chloride.

Monomers that may be copolymerized with vinylidene chloride include styrene, vinyl chloride, acrylonitrile, vinyl acetate, acrylic methacrylates, such as methyl acrylate and methyl methacrylate. Copolymers of vinylidene chloride and acrylate or methacrylate monomers containing greater than 15 mole percent of the acrylate or methacrylate monomer are amorphous. Similarly, vinylidene chloride-acrylonitrile copolymers containing greater than 25 mole percent of acrylonitrile, and vinylidene chloride-vinyl chloride copolymers containing greater than 45 percent vinyl chloride are also amorphous. Examples of alkyl acrylates and alkyl methacrylates, other than the methyl ester, that may be copolymerized with vinylidene chloride include ethyl, n-butyl, n-hexyl and n-octyl esters. Particularly contemplated are copolymers of vinylidene chloride and vinyl chloride containing between about 70 and about 80 percent vinylidene chloride, and copolymers of vinylidene chloride with methyl acrylate and methyl methacrylate containing between about 70 and about 85 mole percent vinylidene chloride. As used herein the term "copolymer" is intended to include polymers prepared from more than two monomers, e.g., polymers prepared from vinylidene chloride, vinyl chloride and small amounts of other copolymerizable monomers.

Some copolymers of vinylidene chloride, e.g., the copolymer of vinylidene chloride and vinyl chloride, are commercially available. Preparation of vinylidene chloride copolymers by solution, emulsion or suspension polymerization has been described in literature relating to such materials. Emulsion polymerization is used commercially to make vinylidene chloride copolymers. Typically, the polymerization involves emulsifying the reactant monomers in their desired ratio in an aqueous medium using sulfonate or nonionic surfactants, and initiating the polymerization at temperatures of from ambient to 80° C. The polymer latex produced in the emulsion polymerization process is recovered by coagulating and then collecting the latex, followed by washing and drying the polymer. Examples of chemical initiators that may be used for the emulsion polymerization of vinylidene chloride include free-radical types such as potassium persulfate, hydrogen peroxide, organic hydroperoxides, perborates and percarbonates. Redox-type initiator systems such as persulfate/bisulfate and tertiary butyl hydroperoxide-sodium formaldehyde hydrosulfite may also be used.

Suspension polymerization has also been used commercially to produce vinylidene chloride polymers, particularly those that are utilized as molding and extrusion resins. Suspension polymerization commonly employs monomer-soluble free-radical initiators such as organic peroxides, percarbonates and azo-compounds. The polymer is obtained in the form of small, e.g., 30-100 mesh, beads that are de-watered by a centrifuge and then dried in a flash dryer or fluid bed dryer.

The amount of free-radical initiator used is chosen to produce a polymer having an inherent viscosity of at least about 0.4 dl/g, as measured at 25° C. on a 0.5 percent (wt/vol.) solution in chloroform, i.e., 0.5 grams of polymer in 100 milliliters of solution. Polymers having an inherent viscosity in the range of 0.40 to 0.44 are desirable as such materials are considered to be more readily processable by a spinning process into fibers.

The amount of polymerization initiator ordinarily used may vary between about 0.001 to about 0.05 mole percent based on the total amount of monomer reactants, e.g., between about 0.01 and about 0.02 mole percent. A conventional chain transfer agent may be used to regulate the inherent viscosity of the polymer. The amount of chain transfer agent used is ordinarily in amounts of between about 0.1 and about 0.5 mole percent based on the amount of total monomer.

Monomer reactants used to prepare the vinylidene chloride polymer may be purified by distillation and filtration to remove small amounts of chemical impurities, e.g., by-product contaminants and solid particulate matter such as dust, etc., that may be present as a result of their manufacturing process, handling and storage history. Such impurities and particulates (depending on size and concentration) may, when present in the core component of the optical fiber, affect the light-transmitting efficiency of the fiber. When distillation is employed as the method of purification, the distillation is conducted under a slight positive pressure of an inert gas such as argon, nitrogen or helium. Further, to prevent polymerization of the monomer in the distillation column, a polymerization inhibitor may be charged to the column and is present throughout the distillation; but, is removed prior to polymerization.

Various stabilizers and additives that do not effect the fiber's optical properties may be added to the vinylidene chloride polymer after polymerization. Such additives are well known in the art and include additives which absorb or combine with hydrogen chloride, ultraviolet light absorbers, thermal stabilizers, antioxidants, and metal ion scavengers. Hydrogen chloride acceptors include alkaline earth and heavy metal salts of weak acids. Ultraviolet radiation absorbers are generally derivatives of salicylic acid, resorcylic acid, benzophenone and benzotriazols. Antioxidants include phenolic antioxidants such as 2,6-di-t-butyl-4- methylphenol and substituted bisphenols, organic sulphur compounds and organic phosphites. The phosphites also have the ability to chelate metals. In addition, plasticizers or lubricants such as stearyl alcohol may also be added to the polymer.

The method of forming the light transmitting fiber of the present invention is not critical and any known method may be employed. Methods of preparing a composite filament, i.e., a core material having a concentric coaxial cladding, may be divided broadly into two types. One type involves carrying out composite spinning with use of a core-sheath type spinneret. Vinylidene chloride polymer is extruded as a core concentrically surrounded by the polymer of lower refractive index forming the sheath or cladding. Core and sheath materials may be supplied to the spinneret in the form of pellets. They may be supplied in other forms such as finely divided powder to a further extrusion apparatus provided with the spinneret assembly. It is also possible for the vinylidene chloride polymer to be supplied as a solid billet preform.

In the case of using a preform, the billet is extruded by advancing the preform through a barrel with a ram toward an extrusion orifice through which the polymer is forced to form the core of the fiber. The ram can be either of the constant rate type or the constant stress type. The constant rate ram is preferred because its use does not require a melt metering pump.

The temperature at which the core and sheath materials are extruded through the spinneret assembly varies depending upon the particular sheath and core materials employed. Melting viscosities of those materials should be as close as is practically possible to one another in order to produce a substantially uniform composite fiber. The melt viscosity may be varied by suitably selecting the molecular weight of the sheath and/or core material.

The other type of method for preparing a composite fiber involves employment of a spinneret assembly for extruding a non-composite fiber to be formed into the core. Following formation of the core fiber, it is coated with a solution of the sheath polymer and the coated core fiber dried.

Solvents used for preparation of the sheath material solution are preferably those which are capable of dissolving the sheath material, but incapable of dissolving the core material. Solvents which are capable of dissolving the core material may be used provided that the solution of sheath material is of high concentration. Examples of such solvents include halogenated hydrocarbons such as 1,1,2-trifluoro-1,2,2-trichloroethane; ketones such as acetone, methyl ethyl ketone and methyl butyl ketone; acid amides such as dimethylformamide and dimethyl-acetamide, acetic acid esters such as methyl acetate, ethyl acetate, propyl acetate and butyl acetate; dimethylsulfoxide, etc. The concentration of the sheath material in the solvent is preferably within the range of between 10 and 60 percent by weight, more preferably between about 25 and 45 percent by weight, to provide a uniform thickness of sheath material around the core, and for easy removal of the solvent.

As the non-composite core fiber or composite core-sheath fiber leaves the extrusion die, it is quenched by cooling with a water bath or with liquid nitrogen. Crystal orientation within the fiber may be developed in the cooled extrudate by stretching and heat treatment. Stretching produces crystal orientation in a single direction, thereby developing unidirectional properties of high tensile strength, flexibility, long fatigue life, and good elasticity.

During the process of manufacturing the sheath and core materials and the composite fiber, care should be taken so as to prevent or avoid incorporating dust, gases such as air, absorbed water and other foreign particulate and non-particulate matter therein as well as forming thermally degradated products such as low molecular weight coagulants or carbonized products. Such foreign matter and thermally degraded products lead to a reduction in the optical properties of the composite filament.

The cladding material used to form the composite filament should be transparent and have a lower refractive index than the vinylidene chloride polymer core. Preferably, the refractive index of the sheath material should be at least 0.1 percent lower than the core material. Adhesiveness between the core and sheath material should be high; and the melt viscosity of the sheath material should be close to that of the core material. The heat stability of the sheath material should also be high to avoid thermal decomposition at the temperatures of extrusion.

The diameter of the optical fiber core can vary from relatively thin to relatively thick constructions. A suitable diameter range is between about 50 and about 500 micrometers. If the light source is large, e.g., from a LED (light emitting diode), a thick core has the advantage in its ability to capture a greater proportion of incident light, but has the disadvantage of having a larger minimum bending radius. If the light source is small, e.g., a laser, a relatively thin core is suitable for capturing incident light and has the advantage of having a smaller minimum bending radius. The light source is usually one that is compatible with the spectral transmission characteristics and physical dimensions of the fiber.

Since the cladding reflects light traveling through the core, the thickness of the cladding generally is not critical, so long as its thickness is at least a few wave lengths of the light to be transmitted. An example of a suitable range of thickness for the cladding is between about 5 and about 50 micrometers, e.g., between 10 and about 20 micrometers.

Cladding materials that may be used include, for example, polystyrene, poly(methyl acrylate), poly(methyl methacrylate), polycarbonates, silicon resins, ethylene-vinyl acetate copolymers, mixtures of polystyrene and poly(methyl methacrylate), mixtures of poly(methyl methacrylate) and fluorine-containing poly(methyl acrylate) resin, polyvinyl chloride, polymers and interpolymers of vinyl fluoride, vinylidene fluoride, tetrafluoroethylene, hexafluoropropylene, trifluoromethyl-trifluorovinyl ether, perfluoropropyl-trifluorovinyl ether and fluorinated esters of acrylic or methacrylic acids having the graphic formula,

$$X(CF_2)n(CH_2)_mOC(O)-C(Y)=CH_2$$

wherein X is selected from the group consisting of hydrogen, fluorine or chlorine, n is an integer from 2 to 10, m is an integer from 1 to 6 and Y is either methyl or hydrogen.

More particularly, there can be mentioned as cladding materials: vinylidene fluoride-tetrafluoroethylene copolymers, e.g., copolymers having a vinylidene fluoride content of about 60 to 80 mole percent, vinylidene fluoride-hexafluoropropylene copolymers, vinylidene fluoride-tetrafluoroethylene-hexafluoropropylene terpolymers, fluorine-containing methylacrylate polymer, fluorine-containing methylacrylate methyl methacrylate copolymer, vinylidene fluoride-tetrafluoroethylene copolymers containing 5 to 50 percent by weight of methylmethacrylate polymer, ethylene-vinyl acetate copolymers and polyvinyl chloride. Copolymers of the fluorinated esters of acrylic or methacrylic acids of the above depicted graphic formula with methyl and ethyl esters of acrylic and methacrylic acids which are substantially amorphous are a preferred class of polymers. Fluorinated polymers having pendant side chain containing sulfonyl groups, such as disclosed in U.S. Pat. No. 3,849,243, and fluorine-containing elastomers, such as those disclosed in U.S. Pat. Nos. 2,968,649 and 3,051,677, may also be used. Other polymers include copolymers of tetrafluoroethylene with other monomers such as hexafluoropropylene and perfluoroalkyl-perfluorovinyl ether, as disclosed in U.S. Pat. Nos. 2,946,763 and 3,132,123.

Cladding polymeric materials which are not crystalline, i.e., which are substantially amorphous, are preferred because optical fibers clad with a crystalline polymer tend to have higher attenuations of transmitted light than those coated with an amorphous polymer. Optical fibers clad with a crystalline polymer, however, do have utility particularly when only a short length of optical fiber or cable is needed.

In a further embodiment of the present invention, gradient index vinylidene chloride polymer optical fibers are prepared. These fibers have a fluorinated external surface and, within the fluorinated surface vary, i.e., decrease, in refractive index with increasing radial distance from the fiber's longitudinal axis. The graded index fiber will have a substantially perfluorinated surface, i.e., contain many —$CF_2$— groups. The number of —$CF_2$— groups will decrease and be gradually replaced with —CHF— groups with increasing radial distance from the surface, i.e., until a point is reached within the fiber where no fluorination has occurred, e.g., a depth of up to about 60 Angstroms.

Surface fluorination of the vinylidene chloride polymer core may be accomplished by techniques described in the art. Typically, the process utilizes low energy fluorination using a cold plasma. Surface fluorination substantially retains the bulk physical properties of the solid being fluorinated.

In accordance with the aforesaid contemplated embodiment, a fiber of vinylidene chloride polymer is passed slowly through a suitable reactor, e.g., a quartz reactor or fluid bed reactor previously purged with an inert, e.g., helium, gas, and contacted there with a dilute source of fluorine. Generally, the fluorine reactant is provided by elemental fluorine, carbon tetrafluoride ($CF_4$) or sulfur hexafluoride ($SF_6$). The fluorine reactant is diluted with an inert gas such as helium or argon. Concentrations of about 3 to 5 volume percent, e.g., about 4-5 volume percent, for elemental fluorine are typical. Concentrations of up to about 10 volume percent may be used with carbon tetrafluoride.

The fiber is contacted in an oxygen-free reactor with the diluted fluorine reactant at temperatures of from about ambient temperature to about 50° C. and at reduced pressures, e.g., from about 1 to 3 millimeters of mercury. Contact times may vary from about 0.5 to 60 minutes, e.g., from about 1 to 15 or 30 minutes. The fluorine reactant is activated by a cold plasma initiated by inductively coupling the reactor to a radio frequency generator—commonly through a copper coil surrounding the reactor.

As the fiber passes through the reactor, chlorine and hydrogen atoms on polymer molecules at or near the surface are exchanged with fluorine, thereby fluorinating the polymer surface. The amount of fluorine substitution that occurs will depend on the flow rate of the fluorine reactant through the reactor, the pressure within the reactor and the contact time. Generally, it has been reported that flow rates of fluorine reactant, lower reactor pressures and longer contact times favor higher levels of surface fluorination.

The fluorinated layer will vary in thickness, but has been reported to be less than about 100 Angstroms, e.g., between 40 and 60 Angstroms. It has also been suggested that surrounding the polymer to be fluorinated with an aluminum screen, e.g., a tubular aluminum cage, increases the thickness of the fluorinated layer, i.e., improves the depth of fluorination, up to about 60 Angstroms in films.

If desired, the graded index surface fluorinated vinylidene chloride polymer fiber may also be clad with transparent polymers having a lower index of refraction than the fluorinated surface. Cladding polymeric materials may be selected from cladding materials described hereinbefore with respect to the non-surface fluorinated vinylidene chloride polymer core fiber.

Although the present invention has been described with reference to specific details of certain embodiments thereof, it is not intended that such details should be regarded as limitations upon the scope of the invention, except as, and to the extent, they are included in the accompanying claims.

What is claimed is:

1. A light transmitting plastic optical fiber having a vinylidene chloride polymer as the core component, said vinylidene chloride polymer having a copolymer of vinylidene chloride containing at least 60 mole percent of vinylidene chloride.

2. The optical fiber of claim 1 wherein the vinylidene chloride polymer is a copolymer of vinylidene chloride and a further monomer selected from the group consisting of styrene, vinyl chloride, acrylonitrile, vinyl acetate, acrylic acid, methacrylic acid, $C_1$–$C_8$ alkyl acrylates and $C_1$–$C_8$ alkyl methacrylates.

3. The optical fiber of claim 1 wherein the vinylidene chloride polymer is a copolymer of vinylidene chloride and vinyl chloride.

4. The optical fiber of claim 1 wherein the copolymer contains between abut 70 and 80 mole percent vinylidene chloride.

5. The optical fiber of claim 3 wherein the vinylidene chloride polymer has a fluorinated surface.

6. The optical fiber of claim 1 wherein the vinylidene chloride polymer has a fluorinated surface.

7. A light-transmitting plastic optical fiber having a core-cladding structure, comprising a vinylidene chloride polymer core component and a transparent synthetic polymer having a refractive index less than the vinylidene chloride polymer core as the cladding component, said vinylidene chloride polymer being a vinylidene chloride copolymer containing at least 60 mole percent of vinylidene chloride.

8. The optical fiber of claim 7 wherein the vinylidene chloride polymer is a copolymer of vinylidene chloride and a further monomer selected from the group consisting of styrene, vinyl chloride, acrylonitrile, vinyl acetate, acrylic acid, methacrylic acid, $C_1$–$C_8$ alkyl acrylates and $C_1$–$C_8$ alkyl methacrylates.

9. The optical fiber of claim 7 wherein the vinylidene chloride polymer is a copolymer of vinylidene chloride and vinyl chloride.

10. The optical fiber of claim 9 wherein the copolymer contains between about 70 and 80 mole percent vinylidene chloride.

11. The optical fiber of claim 10 wherein the cladding component is poly(vinyl chloride), ethylene-vinyl acetate copolymer, poly(methyl acrylate), poly(methyl methacrylate), mixtures of poly(methyl methacrylate) and fluorine-containing poly(methyl acrylate), polymers and interpolymers of vinyl fluoride, vinylidene fluoride, tetrafluoroethylene, hexafluoroethylene, trifluoromethyl-trifluorovinyl ether, perfluoropropyl-trifluorovinyl ether and fluorinated esters of acrylic or methacrylic acids.

12. The optical fiber of claim 11 wherein the vinylidene chloride polymer core is surface fluorinated.

13. The optical fiber of claim 7 wherein the vinylidene chloride polymer core is surface fluorinated.

* * * * *

UNITED STATES PATENT AND TRADEMARK OFFICE
CERTIFICATE OF CORRECTION

PATENT NO. : 4,807,964
DATED : February 28, 1989
INVENTOR(S) : Edward J. Sare

It is certified that error appears in the above-identified patent and that said Letters Patent is hereby corrected as shown below:

Claim 1, column 8, line 12, delete "having" and substitute --being--.

Claim 4, column 8, line 24, delete "1' and substitute --3--.

Signed and Sealed this

Thirty-first Day of March, 1992

Attest:

HARRY F. MANBECK, JR.

Attesting Officer

Commissioner of Patents and Trademarks